Figure 1:
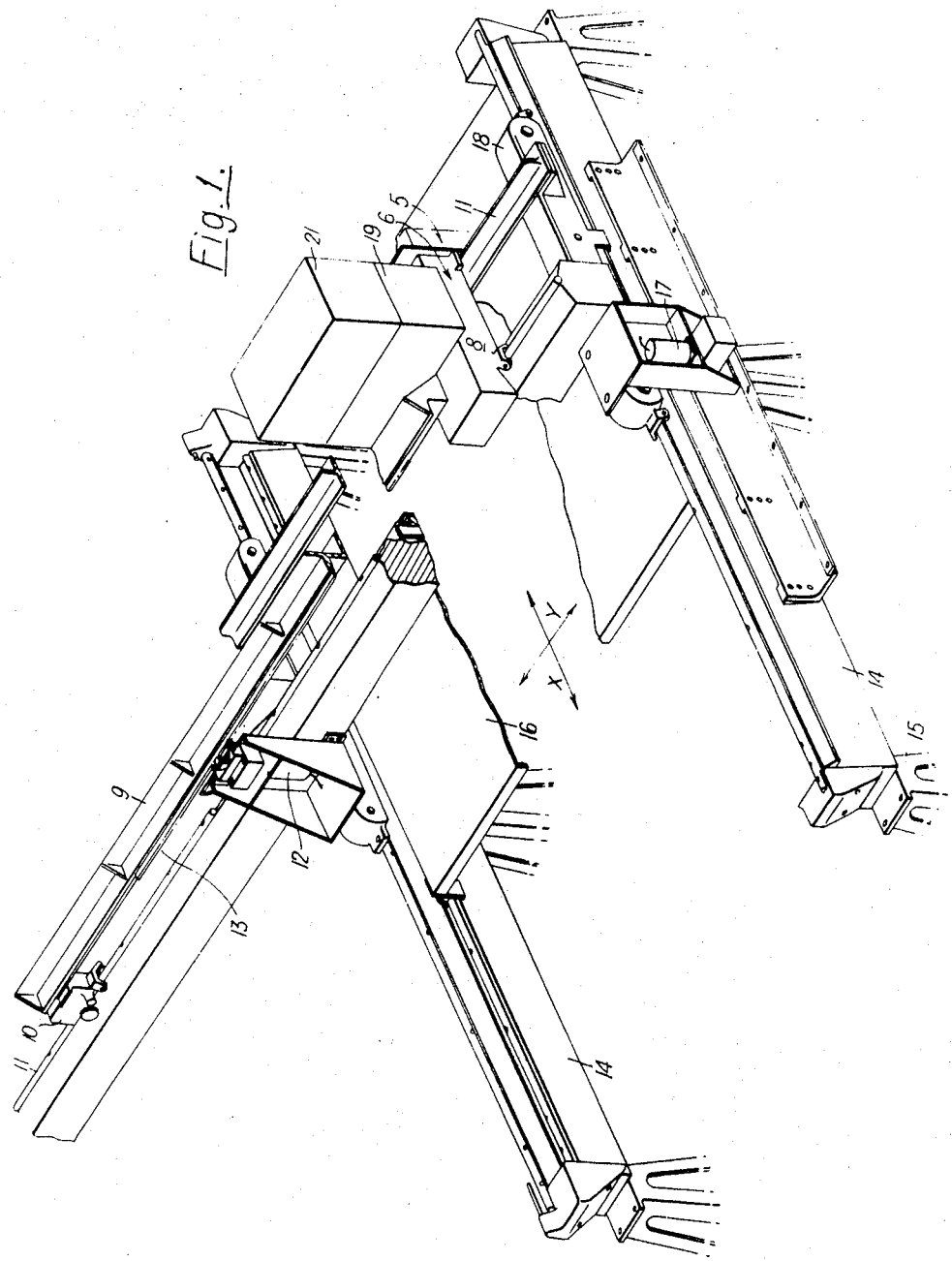

United States Patent [19]

Moss

[11] 3,774,098

[45] Nov. 20, 1973

[54] MACHINE TOOL CONTROL

[75] Inventor: Brian Yoxall Moss, Thornton Heath, England

[73] Assignee: Morfax Limited, Mitcham, Surrey, England

[22] Filed: Feb. 22, 1971

[21] Appl. No.: 117,831

Related U.S. Application Data

[63] Continuation of Ser. No. 788,224, Dec. 31, 1968, abandoned.

[52] U.S. Cl. .................. 318/568, 318/162, 318/577
[51] Int. Cl. ........................................... G05b 19/42
[58] Field of Search .................... 318/162, 577, 568

[56] References Cited

UNITED STATES PATENTS

| 3,159,778 | 12/1964 | Gavreau et al. | 318/568 |
|---|---|---|---|
| 3,217,331 | 11/1965 | Wetzel et al. | 318/568 X |
| 2,755,422 | 7/1956 | Livingston | 318/162 |
| 3,230,516 | 1/1966 | Neergaard | 318/568 X |
| 3,302,209 | 1/1967 | Fengler | 318/568 X |

*Primary Examiner*—B. Dobeck
*Attorney*—Watson, Cole, Grindle & Watson

[57] ABSTRACT

The invention is concerned with the production of recorded program for the continuous path control of machine tools. The program is produced by means of a line follower device or equivalent means, and the driving means for displacing the line follower in response to steering movements of a rotary member of the latter as it follows the line produces alternating current signals the frequency of which lies above or below a reference frequency which is also recorded preferably with a further signal recording the planned movement of a cutting tool towards and away from the cutting position. Such a recorded program actuates servo motors on the machine tool for displacing the workpiece relatively to the tool the drive of the motors being controlled by comparison of the reproduced reference frequency with the recorded control signals to provide a control output to the drive motors dependent on the variable recorded frequencies representing the desired movements of the workpiece relatively to the tool.

8 Claims, 7 Drawing Figures

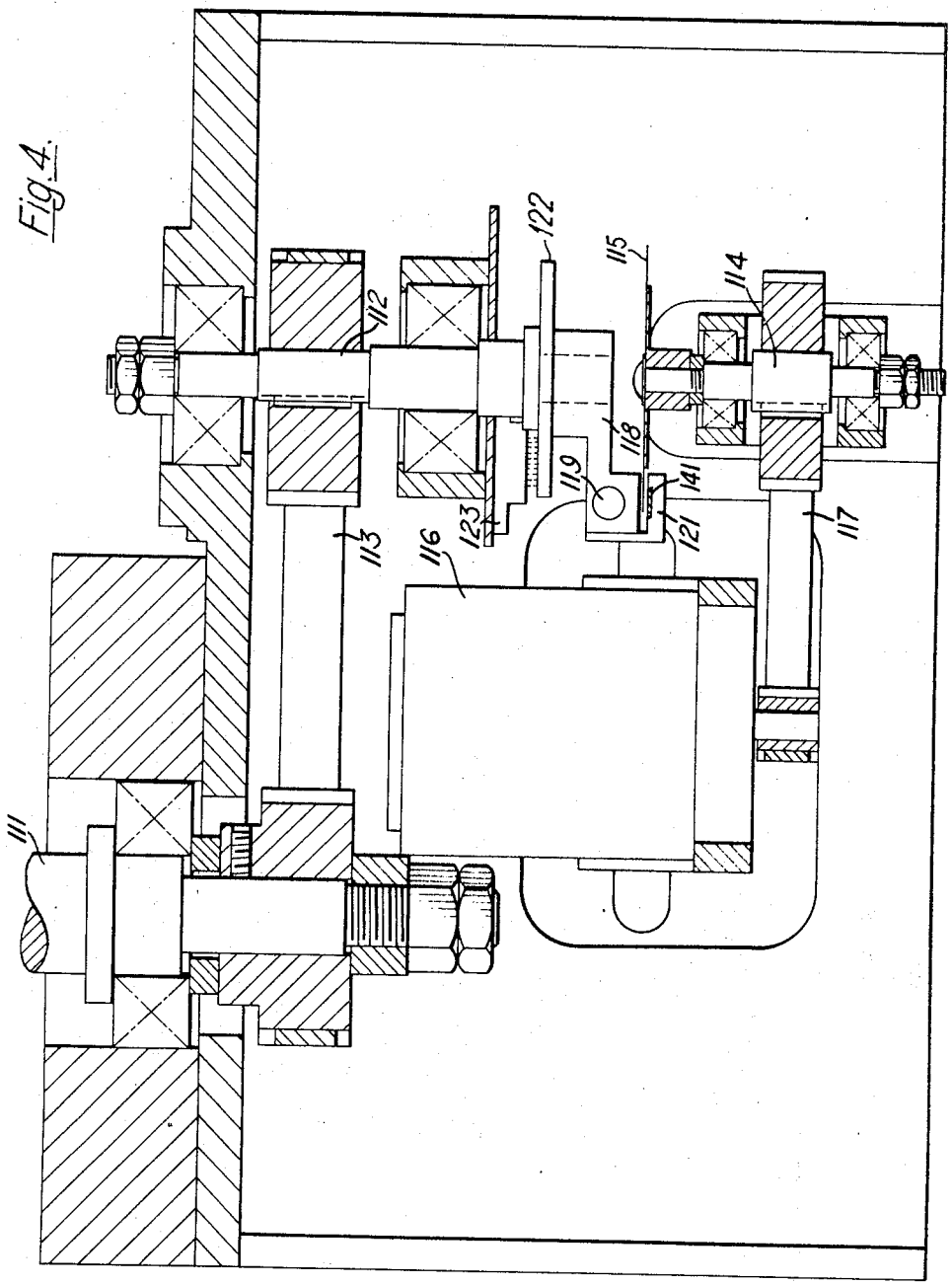

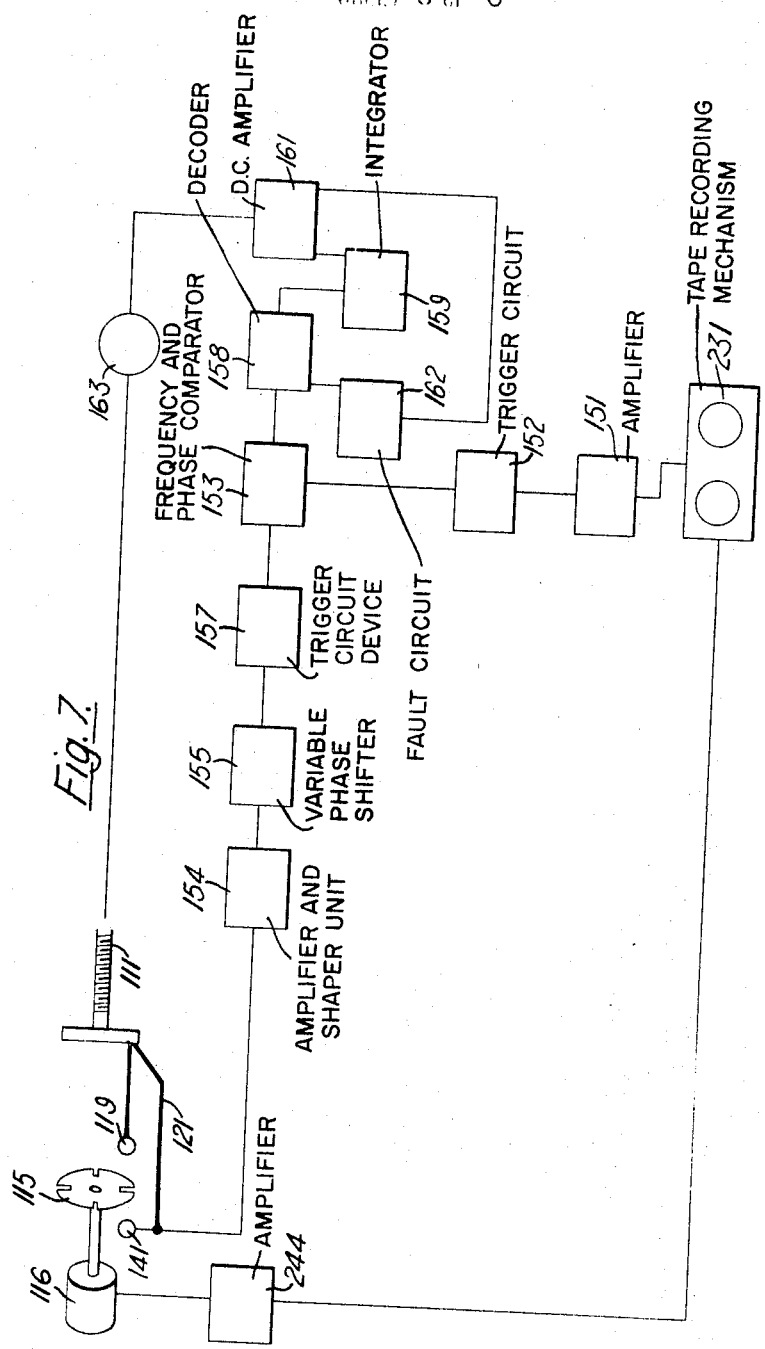

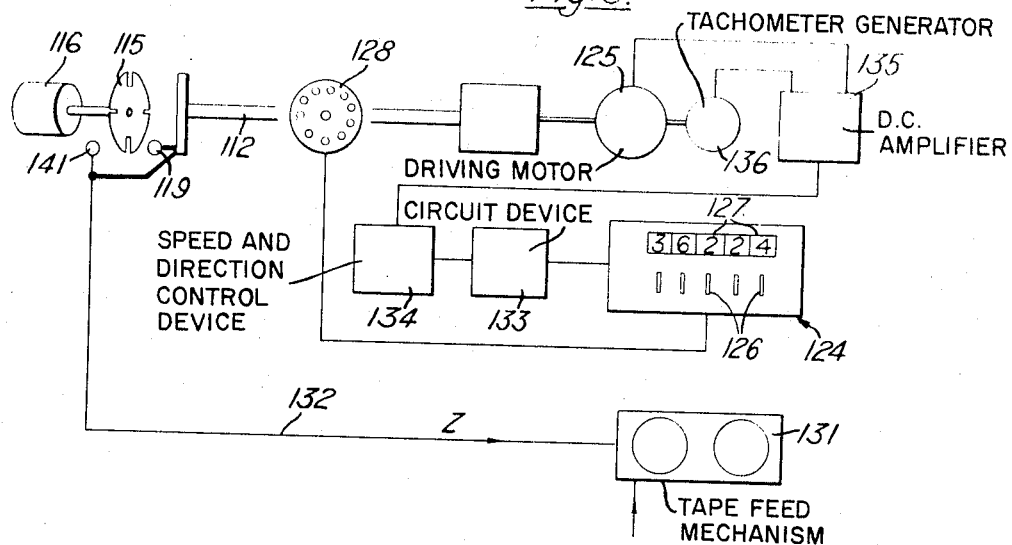
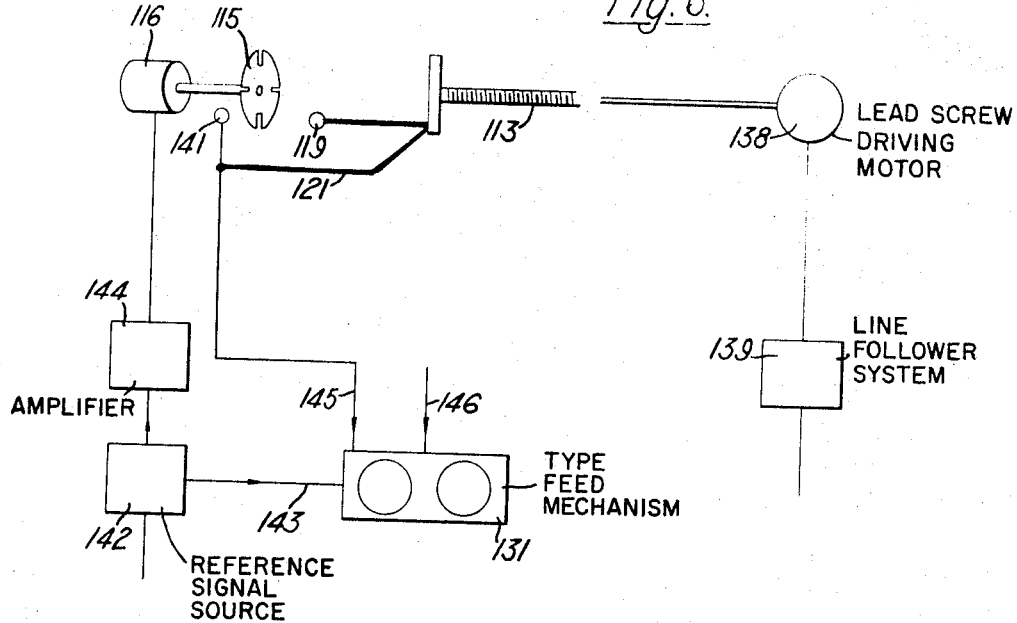

MACHINE TOOL CONTROL

This application is a continuation of Ser. No. 788,244 filed 12-31-68, now abandoned.

The present invention relates to the production of control program appropriate for machine tools arranged for continuous path program control and more particularly to the production on a recording medium, such as magnetic tape, of a continuous path program for controlling the relative movement of a tool and of a workpiece in a machine tool for carrying out various machining operations such as milling or contouring of a workpiece or positioning the latter for performing drilling at predetermined points.

Various proposals have been made for the design of programme-controlled machine tools operating on an incremental basis but for continuous path control the production of the necessary program is often a complicated and expensive operation because a computer is required for the production of the program. This difficulty can be circumvented by recording digital or co-ordinate information on the medium but for continuous path control a computer must be provided on the machine tool to convert the recorded information into a form suited for controlling a machine tool.

When using a computer a continuous path program may be recorded for example on magnetic tape and may consist of alternating current signals, or pulses derived from such signals, in which coordinate movements to be executed by the workpiece or the tool are recorded by alternating current signals or pulses, the frequencies of which, as compared with a reference frequency, represent the coordinate movements to be imparted to the workpiece or to the tool. Thus a section of the program where the signal is recorded at the reference frequency represents no movement, whereas a section embodying a record at a frequency above or below the reference frequency represents a movement in one sense or the other. It will be understood that a program recorded in this way may be utilised conveniently for actuation of the machine tool in directions along X- and Y- axes and thus permits the contour of the workpiece to be machined precisely in accordance with the information recorded on the program or permits drilling to be effected at specified points of the workpiece. An additional channel will normally have to be recorded on the program to indicate the movements of a cutting tool into and out of the cutting position, referred to as the Z-axis movement while in some cases further signals, representing other co-ordinates for example, may also be recorded.

Heretofore such continuous path program have been produced by the design being required to produce a chart representing reference points of the workpiece to be produced and the details from this chart are then fed into a computer which is programed to evaluate the information and to produce a magnetic tape record having the required characteristics and bearing several tracks of alternating current signals or pulses derived therefrom, the frequency varying according to the co-ordinate movements to be imparted to the workpiece relatively to a cutter when such workpieces are being machined and in the manner indicated above. Such program are hereinafter referred to as "program of the character specified." Machine tools of various types are available which are compatible with such program and permit machining operations to be carried out on workpieces under the control of magnetic tape or other recordings of program of the character specified.

It will be realized that the production of program in this way requires considerable skill and experience and the program cannot generally be produced under the control of the design since the use of a computer is involved. Considerable care and skill is required in the production of the charts for feeding to the computer and of course any error in the production of the charts is reflected in the workpieces produced from the taped program. All these considerations mean that each recorded program represents a comparatively costly item.

The present invention is directed to the provision of a new procedure for the production of programs of the character specified which are suitable for use on continuous path program-controlled machine tools capable of being operated by program recorded for example on magnetic tape. Consequently program produced according to the present invention may be utilized on any machine tool designed for operation on a continuous path basis under the control of a program of the character specified.

The object of the present invention is further to enable such program to be produced without involving the use of a computer either in producing the program or in controlling the machine tool from the program. The invention thus provides a simple and easily operated system for the production of program for controlling machine tools and it is applicable both to the control of existing types of tape-controlled machine tools and also to the control of purpose-built machine tools specifically designed for operation with the program produced according to the present invention.

Various proposals have been made for the control of machine tools and like production equipment by what may be termed follower or scanning equipment in the braodest sense, this term including line following equipment for reproducing the outline of a drawing and typically such as described in applicant's co-pending applications Ser. Nos. 594,768 now U.S. Pat. No. 3,470,376, dated June 20, 1969 and 671,682 now U.S. Pat. No. 3,515,963, dated June 2, 1970. Similarly equipment for following the shape of a template or model has already been proposed, and a wide variety of equipment is also known in which a stylus or the like is caused to follow the periphery or contour of an object to be reproduced. More specifically the present invention is based on utilizing the movements of such types of follower or scanning equipment for producing alternating current signals or pulses which are recorded directly on a recording medium and in a manner which is compatible with the control of a machine tool or the like capable of being controlled by a program of the character specified. Thereby it becomes possible to produce a program appropriate for the control of a machine tool, by direct scanning or examination of a profile or drawing and without involving the use of a computer at any stage.

In its broadest aspect the present invention therefore comprises causing a follower device to travel progressively along a representation of an article to be machined by imparting relative displacement to the follower device and to the representation of the article, producing an alternating current signal the frequency of which is dependent on the rate of such displacement and recording such signal on a recording medium.

The present invention further comprises a method of controlling a machine tool wherein relative motion is imparted to a workpiece and to a cutting or forming implement by means of a program produced as defined above and arranged for continuous path operational control of such relative movement preferably in at least two coordinate axes coupled with a further controlled movement representing the displacement of the cutting tool into or out of the working position or for controlling drilling operations for example.

In applying the present invention a wide variety of line or profile following equipment may be utilized in which a stylus, light-sensitive device or like follower device is caused to travel around an outline or profile representing the workpiece to be produced and in which the requisite movements are imparted to the stylus or to the light-sensitive device means of a co-ordinate system involving drive motors for at least two different co-ordinates which may be, for example, X- and Y- movement co-ordinates.

In this case displacement of such drive motors is utilized for modifying the frequency of a reference signal to produce a signal at a frequency different from the reference frequency and lying above or below said reference frequency according to the sense of the coordinate movement, and the resulting frequencies or pulse signals derived therefrom are caused to be recorded on a recording medium, for example a magnetic tape, which also records the reference frequency and may also record an additional signal representing the movements of a cutting tool in order to bring it into or out of the cutting position during the machining operation.

The invention can be carried into effect in various ways according to the nature of the following equipment utilized. In many cases displacement of the follower so as to cause it to follow an outline, template or pattern is effected by means of lead screws in the X- and Y-axis directions. In an arrangement of this kind a sector wheel may be driven by a constant speed motor and is disposed in alignment with the lead screw, or with a shaft deriving its movement from the lead screw, and said sector wheel is scanned by a light-responsive device mounted on the lead screw or on said shaft. When the lead screw is stationary the light-sensitive device receives an alternating current signal the frequency of which is dependent on the speed of the driving motor, whereas when the lead screw rotates in one direction or the other frequency of the signal at the light-sensitive device differs from the reference frequency being above or below that frequency to an extent dependent on the speed of the lead screw.

The output from the light-sensitive devices associated with the X- and Y-axis lead screws can thus be directly recorded on two tracks of a magnetic tape or pulse signals derived from the alternating signals can be so recorded to produce two tracks of the program. A third track may record the reference frequency while a fourth track may be utilized for recording the required movements of a cutting implement on the machine tool for the purpose of carrying out the required operations.

This fourth track recorded by means of a Z-axis control unit into which information is inserted conveniently by means of decade switches representing the starting position of the cutting tool at some predetermined reference point, as well as information as to the various movements if the cutting tool into the cutting positions relatively to the workpiece. The Z-axis control unit incorporates a shaft driven by a variable speed motor adapted to be stopped by the decade switches after predetermined movement controlled by the decade switches. The said shaft carries a photo-electric device rotatable relatively to a sector wheel rotated by a constant speed motor driven from the reference frequency in the same way as the X- and Y-axis lead screws. The said shaft further carries a perforated disc placed adjacent a stationary light-sensitive device adapted to operate counter elements associated with the decade switches to stop the Z-axis motor when the decade switches have reached the predetermined preset value. During this movement the photo-cell associated with the sector wheel produces an alternating current differing from the reference frequency according to the speed of the variable speed motor in the same way as for the X- and Y- axis recording, and this alternating current or pulses derived therefrom, is recorded on the fourth track and is thus available for controlling the movement of the cutter on the machine tool to bring it to the required starting position at a rate and to the extent set up by the operator.

The invention is not however limited to the use of a sector wheel system and co-operating photo-cell device for obtaining a signal the frequency of which is dependent on the rate of travel of a follower device in the X- and Y-axis directions by movements derived for example from lead screws. Other means such as diffraction grating systems can be used in which the alternating current signal output is obtained directly from the movement of the following head, and a wide range of other alternative systems can be adopted.

In other arrangements the requisite movements of the follower device are obtained by linear motor devices, for example hydraulic or pneumatic systems, and a rotary movement is derived from the linear motion by means of any suitable converter device, for example a rack and pinion system, to provide the rotary movement from which the recordable electric signals are produced.

One convenient method of producing a taped program according to the present invention will be explained by way of example. In this example it is assumed that a workpiece is to be machined from a drawing which is prepared by a draftsman in such manner as to allow for the dimensions of the cutter which is to be used in the machining operation; that is to say, the draftsman will set out the outline which in the case of an external outline is larger than the desired workpiece in all directions by the radius of the cutter to be used. The draftsman will also mark a reference point on his drawing normally externally of the outline to be reproduced. The draftsman will then draw a lead line from the reference point to a selected part of the outline (for example a corner — in which case the lead line conveniently is in line with and joins one limb of the angle) and any other guide lines necessary to direct the line-following equipment to traverse the outline and to execute any other machining operations necessary at preselected points of the workpiece, and ultimately to return to the reference point.

The drawing so produced is then inserted on the line follower equipment and a follower head which may have a photo-electric cell device, such as described in the aforesaid copending applications is brought over the reference point. In a typical example the operator will now insert on the decade switches of the Z-axis control unit information as to the required initial movement of the cutting tool, and will select the desired feed speed or speeds and will start the tape feed thus entering the Z-axis information on the Z-track.

When the counters controlled by the decade switch have completed their movement the Z-axis driving motor stops and the follower mechanism is then started so as to follow the lead line from the reference point on the drawing towards the outline to be machined. The X- and Y-axis movements of the follower head are recorded as signals on pulses the frequencies of which depend on the X- and Y-axis movements. Immediately before the outline is reached a stop mark, for example a transverse line, may have been marked on the lead line, which stops the follower mechanism, as described, in applicant's co-pending application Ser. No. 748,782. With the tape feed still operative the X- and Y-tracks now record the reference frequency. The operator can now insert further Z-axis information as to the feed movement and rate of the cutting tool into the cutting position; this is inserted by the decade switches, as already explained. Then the follower is re-started and commences to traverse the outline, being stopped where necessary by the provision of cross-markings on the outline or at the guide-in and guide-out points. The stop markings are provided so that the requisite movements can be inserted into the Z-axis record to determine the movements of the cutting tool.

In some cases Z-axis movements may be superimposed on the X- and Y-axis movements. Eventually the follower returns to the reference position and the recorded program is then complete and can be passed to a machine tool capable of being controlled by a tape record of the character specified. The reference track provides a constant reference frequency relatively to the X-, Y- and Z-axis tracks whereby the requisite information is available in a form suitable for direct control of the machine tool without requiring the use of a computer and merely at the minor expense of providing an accurate drawing representing the workpiece.

Figure 2:
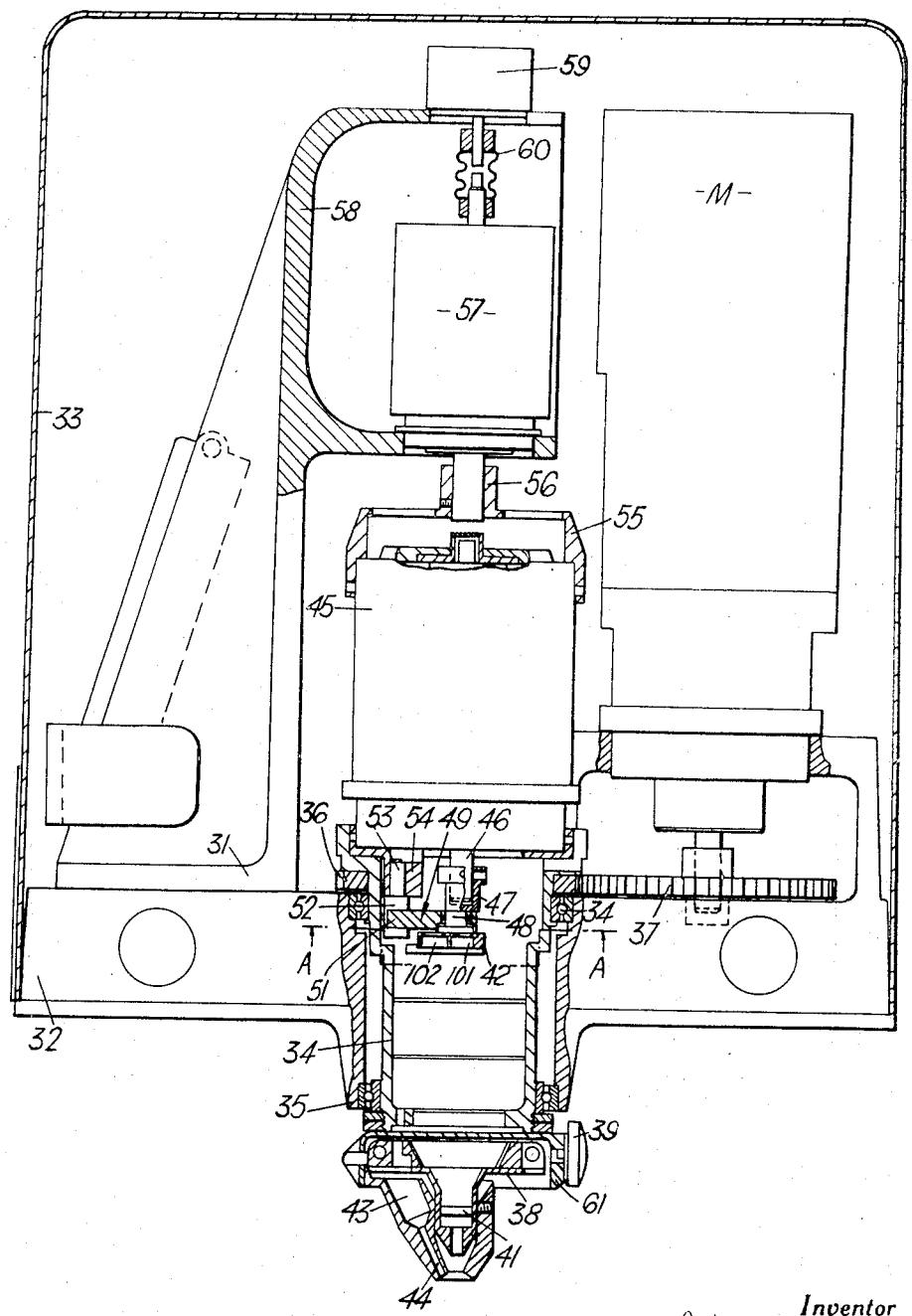
Figure 3:
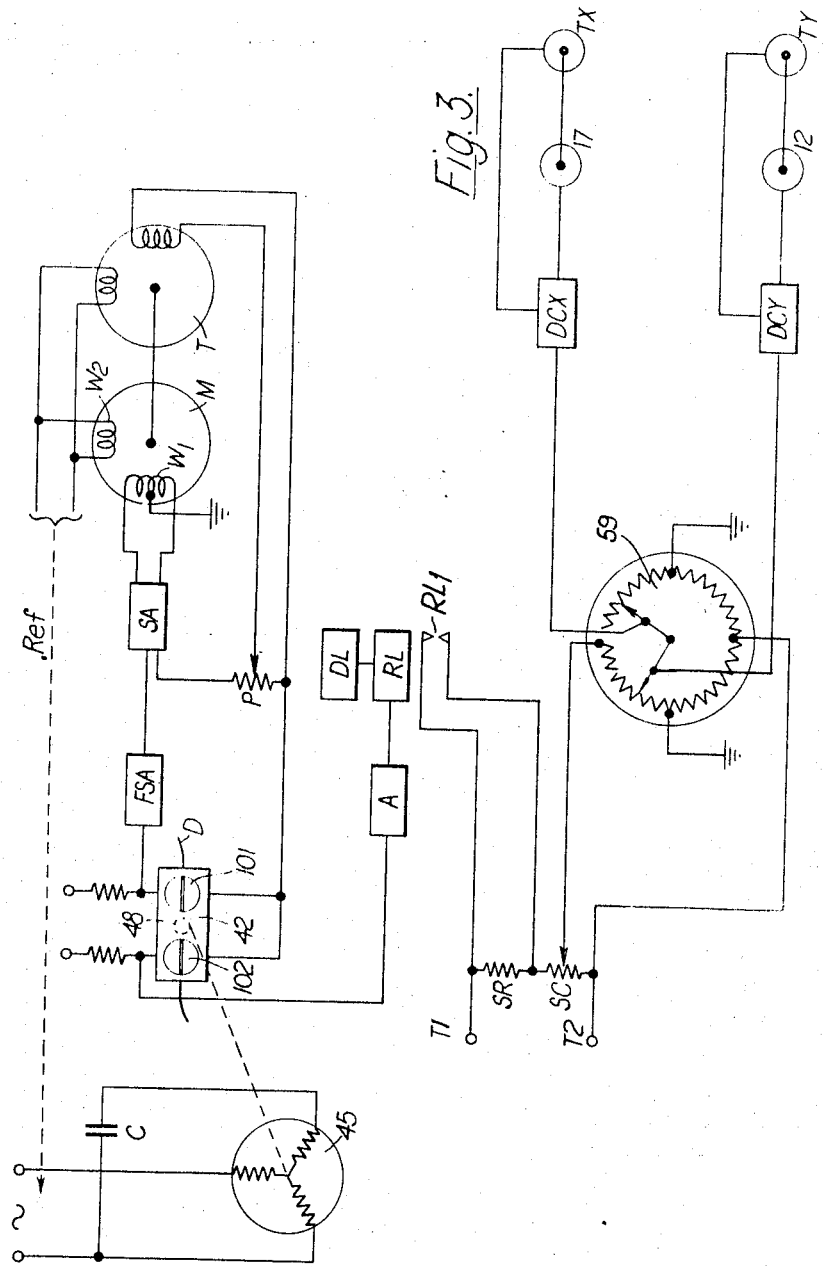

The features of the present invention are illustrated diagrammatically and by way of example on the accompanying drawings which also illustrate in outline typical forms of line follower equipment for use in the production of recorded programs and in which:

FIG. 1 illustrates the mounting of line following equipment for displacement along co-ordinate X- and Y-axes over a table adapted to receive an outline to be recorded for later reproduction on a machine tool, FIG. 2 is a part sectional view illustrating typical line follower equipment, FIG. 3 is a circuit diagram showing the operation of the line follower equipment and of co-ordinate axis drive motors, FIG. 4 is a diagrammatic view showing how alternating current signals are produced the frequency of which is dependent on the rotation of the co-ordinate axis drive motors, FIG. 5 and 6 illustrate diagrammatically the circuit features associated with the recording equipment for the magnetic tape programs, and FIG. 7 is a block circuit diagram illustrating the reproducing system for controlling a machine tool from a magnetic tape record.

Referring first to FIG. 1 of the drawings, the follower head shown in detail on FIG. 2 and indicated generally at 5 is supported on a carriage 6 for movement in two directions along the X- and Z-axes above a table 16 to receive a drawing or similar original to be reproduced. As shown the carriage 6 is supported by a runner 8 and includes a projecting arm 9 carrying a further runner 10. The runners 8 and 10 are supported on parallel rails 11 and are movable lengthwise on said rails in a direction which represents the Y-axis of a co-ordinate system by means of a Y-axis drive motor 12. The rotation of the Y-axis drive motor 12 is imparted to the arm 9 in any convenient way, for example by means of a lead screw or by means of a rack, indicated at 13 on the drawings.

The parallel rails 11 also form the X-axis main carriage and run on parallel support rails 14 suitably supported on fixed carriers 15 with the table surface 16 located between them to carry a template or drawing to be followed by the line follower head 5.

An X-axis driving motor 17 operates a lead screw or a suitable rack, not shown, associated with a carriage member 18 running on one of the rails 14 and serving as supports for the ends of the rails 11.

Box-like housings are shown at 19 and 21 for housing a control unit and the associated power amplifiers required for regulating the operation of the X- and Y-axis driving motors 17 and 12. Thus it will be seen that the follower head 5 is supported by a carriage movable on X- and Y-axis guide rails for universal movement in a plane parallel to the plane of the drawing outline or template to be followed. The movements in the two directions are obtained from motors 12, 17 each with tachometer generator feed back speed control, the control signals for the motor being taken from amplifiers operated from a sine/cosine potentiometer hereinafter referred to.

A typical construction of the follower head is shown in FIG. 2 in which a main body member 31 is bolted to a base 32 supporting a metal or plastics cover 33. A central bore in the base 32 supports a rotatable member or tube 34 by means of ball bearings 35 and a toothed ring 36 on the tube 34 is engaged with a gear wheel 37 operated by a servo motor M supported by the base 32 parallel to the vertical axis of the member 34. At the lower end the member 34 incorporates an adjustable cross slide assembly 38 adapted to be fixed after adjustment by means of a knurled knob 39.

The slide carries an optical lens system 41 by which an image of a drawing outline D (FIG. 3) being followed is projected on to two light-sensitive devices, such as light-dependent resistors 101, 102 carried by an oscillatory mount 42. The lower part of the slide 38 provides a mounting for one or more pilot light sources located within a housing portion 43 and adapted to project a marker pencil of light through an opening or window 44 which assists in bringing the follower head into position over the outline to be followed. The outline is suitably illuminated by adjacently positioned light sources, not shown, which may be energised by direct current. Alternating current lighting may also be used, in which case appropriate changes may be required in the circuits operated by the light-sensitive devices for driving the servo motor M. Electric connections are made to various electrical components carried by the member 34 by means of a suitable slip ring unit 57 which may be a commercially available unit.

The upper end of the member 34 is enlarged as indicated to receive a rotary driving motor 45 the driven shaft 46 of which carries a bushing 47 having an eccentric driving pin 48. The driving motor 45 is a synchronous rotary motor operated from an alternating current mains supply for the equipment in which case a three-phase motor is preferably used, the third phase being obtained by a phasing capacitor C, indicated on FIG. 3 of the drawing in well-known manner for operation from a single phase supply.

The pin 48 is engaged in a ball bearing rotatable in an aperture in an oscillator block 49 the lower face of which carries the mount 42 for the light-sensitive devices 101 and 102 neither of which is coincident with the aperture in the block 49. The latter is provided with a radially disposed arm 51 which is constrained by being engaged in the formed bottom part 52 of a spindle 53 rotatable in a bore in alug 54 projecting inwardly of the bore within the member 34.

It will be seen that when the driving motor 45 is in operation the aperture in the oscillator block is rotated in a circular path about the main vertical axis of the motor 45 while the projecting arm 51 of the oscillator block 49, being accommodated in the forked end part 52 of the spindle 53, moves in a linear reciprocatory manner.

Referring to FIGS. 2 and 3 it will be seen that the light-sensitive device 102 lies on the opposite side of the pin 48 to the arm 51 and it will thus execute an approximately elliptical movement with its major axis transverse to the length of the image of the outline, which extends in the same direction as the arm 51 under normal operating conditions. This device 102 serves as a forward-seeking cell which detects approaching changes in direction of the outline. The light-sensitive device 101 is the main follower cell and, being nearer the arm, executes a substantially elliptical movement — or more correctly an oval movement — with the major axis along the image of the outline D.

The casing of the motor 45 rotates with the carrier tube 34 and the upper end of said motor is engaged within and fixed to a cup member 55 to which is attached an upwardly projecting shaft 56 connected to the slip ring unit 57. The upper end of the shaft 56 is connected through a bellows coupling 60 to a sine/cosine potentiometer 59 mounted in the upper part of a bracket member 58 standing upwardly from the base 32.

Referring to FIG. 3 the output signal from the main follower cell 101 is applied to an amplifier FSA which embodies filter circuits adapted to reject components at twice the oscillation frequency. The resulting signal varies in phase depending on the angular disposition of the outline D relatively to the oscillatory movement of the holder 42 and is fed to a servo amplifier SA feeding a main winding $W_1$ of the servo motor M. A further winding $W_2$ receives a reference frequency from the main supply. The motor M is thereby caused to rotate in one direction or the other, thereby steering the rotatable member 34 and the associated parts, in one direction or the other according to the path of the outline being followed. When the outline D is centrally positioned in relation to the oscillatory movement of the holder 42 the windings $W_1$ and $W_2$ produce no torque so that the servo motor M is stationary. As the follower head appraoches a deviating section of the outline D the current in the winding $W_1$ varies in phase so that the motor M exerts a torque in one direction or the other which results in a steering motion being imparted to the rotatable member 34 such that it is steered so as still to follow the outline and so that the linear movement of the arm 51 is centered on the outline.

The change in the rotary position of the member 34 actuates the sine/cosine potentiometer 59 to vary the operation of the motors 17 and 12 in such manner that the follower head also follows the changing drawing outline D. The amplifier SA also receives from the potentiometer resistor P an adjustable feed back sensitivity signal from a tachometer generator T driven by the servo motor M and which also receives the reference frequency.

The forward seeking light-sensitive device 102 feeds an amplifier A in turn operating a relay RL associated with a delay circuit DL which delays the operation of the relay RL a contact $RL_1$ of which provides a slow-down control in association with the circuits driving the X- and Y-axis co-ordinate motors, as explained below. The result is that when the forward-seeking light-sensitive device 102 senses a substantial change in direction in the outline, the relay RL is energised in normal operation, is released and the speed of the co-ordinate motors is reduced. The re-closing of the relay is delayed sufficiently by the delay device DL to ensure smooth and correct operation.

The sine/cosine potentiometer 59 is energized from a floating stabilised reference voltage supply at terminals $T_1$ and $T_2$. A slowdown resistor SR and a speed control potentiometer SC are connected in series across the terminals $T_1$ and $T_2$ the resistor SR being in turn shunted by the relay contact $RL_1$. A variable voltage from the speed control resistor SC is fed to opposed inputs of the potentiometer 59 while points at right angles thereto are earthed as indicated. The two moving elements of the sine/cosine potentiometer 59 disposed at right angles one to the other are connected to D.C. amplifiers DCX and DCY feeding the two co-ordinate driving motors 17 and 12. Each of these motors is associated with a tachometer generator TX and TY respectively which provide a feed back signal to the amplifiers DCX and DCY.

FIGS. 4 to 7 illustrate in block circuit form and in diagrammatic way methods and equipment for producing recordings of the movements of the follower head and for controlling a machine tool if necessary at a different time and place by such a recording. Thus it may be assumed that a workpiece is to be machined from a drawing which is prepared by a draftsman in such manner as to allow for the dimensions of the cutter which is to be used in the machining operation; that is to say, the draftsman will set out the outline which in the case of an external outline is larger than the desired workpiece in all directions by the radius of the cutter to be used. The draftsman will also mark a reference point on his drawing normally externally of the outline to be reproduced. The draftsman will then draw a lead line from the reference point to a selected part of the outline (for example a corner - in which case the lead line conveniently is in line with and joins one limb of the angle) and any other guide lines necessary to direct the line-following equipment to traverse the outline and to execute any other machining operations necessary at preselected points of the workpiece, and ultimately to return to the reference point.

The drawing so produced is then inserted on the line follower equipment and the follower head 5 is brought over the reference point. In a typical example the operator will now insert on the decade switches of the Z- axis control unit information as to the required initial movement of the cutting tool, and will select the desired feed speed or speeds and will start the tape feed thus entering the Z-axis information on the Z-track.

When the counters controlled by the decade switch have completed their movement the Z-axis driving motor stops and the following mechanism is then started so as to follow the lead line from the reference point on the drawing towards the outline to be machined. The X- and Y-axis movements of the follower head are recorded as signals or pulses the frequencies of which depend on the X- and Y-axis movements. Immediately before the outline is reached a stop mark, for example a transverse line, may have been marked on the lead line, which stops the follower mechanism. With the tape feed still operative the X- and Y-tracks now record the reference frequency. The operator can now insert further Z-axis information as to the feed movement and rate of the cutting tool into the cutting position; this is inserted by the decade switches, as already explained. Then the follower is restarted and commences to traverse the outline, being stopped where necessary by provision of cross-markings on the outline or at the guide-in and guide-out points. The stop markings are provided so that the requisite movements can be inserted into the Z-axis record to determine the movements of the cutting tool. In some cases Z-axis movements may be superimposed on the X- and Y-axis movements. Eventually the follower returns to the reference position and the recorded programme is then complete and can be passed to a machine tool capable of being controlled by a tape record of the character specified. The reference track provides a constant reference frequency relatively to the X-, Y- and Z-axis tracks whereby the requisite information is available in a form suitable for direct control of the machine tool without requiring the use of a computer and merely at the minor expense of providing an accurate drawing representing the workpiece.

FIG. 4 shows a control unit attachable to the X- or Y-axis lead screws 111. Mounted either concentrically with the lead screw 111 or concentrically with a layshaft 112 driven from the lead screw 111 by means of a toothed belt 113, is a further shaft 114 carrying a toothed sector as shown at 142 in FIG. 6 from a supply at the reference frequency wheel 115 driven by a constant speed motor 116. In the embodiment shown the wheel 115 is driven by a toothed belt 117. The end of the shaft 112, or the lead screw 111 where the shaft 114 is concentric with the latter, carries an arm 118 housing a light source 119 and a bracket 121 extending to the other side of the sector wheel 115 and carrying a light-sensitive device, indicated at 141. Current supply to the light source 119 and connections to the light-sensitive device are made through a disc 122 carrying slip rings, not shown, engaged by a stationary brush assembly 123 to provide connections to the control circuit.

It will be observed that when the lead screw 111 is stationary an alternating current signal is taken from the light-sensitive device in the bracket 121 which is dependent on the rotary speed of the sector wheel 115 and is equivalent to the reference frequency, whereas when the lead screw 111 is in rotation in one direction or the other an alternating current signal is produced at the light-sensitive device 141 the frequency of which is above or below the reference frequency. This construction is substantially the same for the X- and Y-axis control units.

In the case of the Z-axis control unit mechanism similar to that shown on the drawings is used apart from the lead screw 111, and the shaft 112 of the Z-axis unit is now driven from a variable speed motor, operated from the Z-axis control unit 124 shown on FIG. 5 of the drawings. A perforated disc 128 is furthermore mounted on the shaft 112 and the light-sensitive device 141 is located on one side of the disc and the light source on the other side of the disc. The speed and direction of the driving motor 125 is dependent on the setting of a control knob on the control unit 124 and starting of the motor is controlled by a suitable start button and stopped at the end of the count down set on the decade switches shown at 126. For convenience bi-directional decade counter elements are also provided, as shown at 127, to assist the operator in setting up the equipment and to enable him to see when the Z-axis shift movement has been completed.

In general while the Z-axis control unit is in use the drive from the follower head to the X- and Y-axis drive motors is disconnected and may be re-started automatically or by an additional start knob when the Z-axis control had completed its movement as set up by the decade switches 126. The follower head mechanism may, as already indicated, be arranged to stop the following action when any cross marking or similar stop marking is encountered on or beside the outline being followed. In some cases it may be desired to over-ride this stop feature, and for this purpose an over-ride control button may also be provided on the control panel incorporating the Z-axis control.

Further features are indicated by way of example on FIG. 5 of the drawings. The tape feed mechanism and associated amplifiers are indicated in generalised form at 131 together with the input line 132 fed from the light-sensitive device 141 adjacent to the sector wheel 115 driven by the constant speed motor 116. The light-sensitive device is arranged, as already explained with reference to FIG. 4, to be carried by the shaft 112. The perforated disc 128 controls the feed of pulses to the counter unit 124 and the latter provides an output for regulating the speed and direction of the driving motor 125 the feed path including coincidence circuit devices 133 and a speed and direction control device 134 feeding a direct current amplifier 135 driving the motor 125 and receiving a feed back signal from a tachometer generator 136 driven by the motor 125.

FIG. 6 shows diagrammatically the essential features, already referred to in connection with FIG. 4, for recording the X- and Y-axis signals. The lead screw 111 is indicated together with the lead screw driving motor 138 driven by the line follower system indicated generally at 139. In FIG. 6 the motor 138 is assumed to be the X- axis driving motor. The lead screw 111 (or the equivalent lay shaft 112 of FIG. 4) supports a bracket 121 carrying a light source 119 and the light-sensitive device 141 and these parts are carried by the shaft of the lead screw 111 in a rotary path around the sector wheel 115 driven by the constant speed motor 116. The latter is operated from a reference signal source 142 which feeds through a line 143 a reference channel signal to the tape feed mechanism 131, which signal is recorded on one track of the tape. An output from the reference signal source 142 operates the motor 116 through an amplifier 144. The reference frequency input line to the tape feed mechanism 131 is indicated at 145 and a similar feed is indicated at 146 for the Y-axis signals which are supplied by a second unit substantially identical with the unit shown in FIG. 6 and comprising the parts 139, 138, 111, 121, 119, 141, 115 and 116.

It will be understood that in a simple form of the invention such as shown on the drawings, four tracks in all are recorded on the recording tape, namely the reference channel, the X- and Y-axis signals derived from the X- and Y-axis lead screws and a Z-axis signal recorded in the manner shown on FIG. 5 of the drawings.

A magnetic tape recorded on the equivalent shown at 131 may be used for the operation of any machine tool adapted to be operated by recorded program signals of the character specified, and such machine tools may have the requisite movements imparted to the workpiece and/or to the tool or tools by means of lead screws, hydraulic drives or in any other convenient way.

The present invention also extends to the control of a machine tool by means of a control unit such as is indicated diagrammatically in block circuit form and by way of example on FIG. 7 of the drawings. In this case 231 indicates a tape reproducing mechanism for controlling a machine tool having a work table to receive the workpiece which is operated by X- and Y-axis lead screws one of which is indicated at 111. This lead screw carries a bracket 121 supporting a light source 119 as well as a light-sensitive device 141. The latter elements embrace a sector wheel 115 driven by a constant speed motor 116 operated through a amplifier 244 from the reference frequency track on the tape program being run through on the tape reproducing mechanism 231.

The signals from the X- and Y-axis tracks are each fed through an amplifier 151, a trigger circuit device 152 and a frequency and phase comparator device 153. The latter also receives signals from the light-sensitive device 141 which pass through an amplifier and shaper unit 154, a variable phase shifter 155 for adjusting zero and a trigger circuit device 157.

The output from the comparator 153 is fed to a decoder 158 and integrator 159 and to a D.C. amplifier 161 which provides a feed back through a fault circuit 162 to the decoder 158 and operates a driving motor 163 for operating the lead screw 111 and thereby for effecting displacement of the workpiece relatively to the cutting tool. Obviously the motor 163 may be a direct current motor or it may be a hydraulic control device either driving the lead screw 111 or effecting direct displacement of the workpiece or tool. A similar circuit system for the other co-ordinate channel provides for the required movement of the workpiece relatively to the tool in all directions while the Z-axis track is utilized for imparting the required feed movements to the cutting tool to move it towards or away from the workpiece being machined.

In all cases regulation of the X- and Y-axis motions imparted to the workpiece table and the Z-axis movements imparted to the cutting tool towards and away from the cutting position, is obtained by the output of the comparator 158 the output of which controls the respective driving motor 163. The comparator 153 compares the respective control frequencies received from the recording equipment through the amplifier 151 with the signal received from the light-sensitive device 141 representing the actual movement of the respective lead screw 111. The output of the comparator 153 provides in effect an error signal which ensures that the respective driving motor 163 accurately reproduces the signal on the respective track of the magnetic tape being reproduced on the tape reproducing mechanism 231. The sector wheel 115 is driven by the sychronous motor 116 at a speed determined by the recorded reference signal being reproduced by the tape reproducing mechanism 231.

In all cases regulation of the motion imparted to the work-piece table is obtained by comparing the recorded signals with the also recorded reference signal which is used for driving a member such as the sector wheel 115 by the synchronous motor 16.

The invention is thus based on a method of recording continuous path information on a recording medium in which a displacement in one direction or the other is represented by a recorded signal having a frequency above or below a reference frequency. The signal to be recorded is not necessarily obtained by movement derived from the rotation of the lead screw 111 and is not limited to obtaining the signal by the combination of a sector wheel 115, a light source 119 and a light-sensitive device 141. A linear movement imparted by hydraulic or pneumatic devices to a slide member carrying the follower head may be converted into a rotary movement by means of a rack and pinion device and such rotary movement used to drive a rotary member carrying as assembly including a light source similar to 119 and a light-sensitive device 141. In all arrangements the photo-electric system may be replaced by other equivalent signal-producing systems, for example a toothed wheel of magnetic material carried by the lead screw or equivalent shaft which may be associated with an inductor coil which is rotated by a constant speed motor 116. Further, linear motion imparted to a slide, for example by means of a hydraulic or pneumatic control, need not necessarily be converted into a rotary movement as signals may be taken from a linearly extending signal-producing element such as a toothed member extending along the path of linear movement and producing signals by photo-electric or inductive means driven by a constant speed motor 116 and adapted to produce an output at reference frequency when the slide is stationary and at a frequency above or below that reference frequency when the slide is in movement in one direction or the other.

Other alternatives to the use of photo-electric or inductive signal-producing means include devices relying on the Hall effect or such signals may be produced by means of resolvers or synchros.

In all embodiments of the invention it is readily possible to produce a mirror image reproduction of the outlined article by rearranging the recording circuit in such manner as to result in reversal in that direction of rotation of the driving means on the machine tool to be operated by the recorded program.

What is claimed is:

1. A method of producing a continuous path recorded program for control of a machine tool, comprising eliminating a contour outline representing an article to be machined on said machine tool, scanning said outline by means of an automatically movable electro-optical line follower device, deriving signals from light-sensitive means within said device to cause said device to automatically move progressively along said outline, deriving a rotary movement from the movement of said device which is associated with means adapted to produce an alternating current signal from a said signal having a frequency which varies above a reference frequency according to the rate of said rotation in one direction and varies below the same reference frequency according to the rate of said rotation in the other direction, the derived rotary movement being imparted to a first rotary member within said device, cooperating with a second rotary member within said device driven at a constant speed, one of said rotary members comprising a light-sensitive device and the other of said rotary members comprising a sector wheel movable across the field of said light-sensitive device to cause the latter to produce said variable frequency alternating current signals dependent upon said movement, and recording said signals on a recording medium for later reproduction of said movement.

2. A method according to claim 1, wherein the follower device is displaceable in two directions on a co-ordinate system and two alternating current signals are recorded on the recording medium, such signals representing the respective co-ordinate movements by comparison with a reference frequency.

3. A method according to claim 1, wherein a reference frequency is recorded on the recording medium in addition to the alternating current signal.

4. Apparatus for the continuous path control of the displacement of a movable member on a machine tool in which a recorded variable frequency program includes a reference frequency signal and a displacement control signal recorded at a frequency which differs from the reference frequency by an amount which represents the required rate of displacement, said apparatus including means for reproducing said signals, a power drive for the movable member, said power drive being a rotary servo-motor coupled to the movable member by means of one of a lead screw and a lay shaft driven by said lead screw, a first rotary member on one of said lead screw and said lay shaft reproducing the actual movement of said movable member, and a second rotary member arranged coaxially with said first rotary member and synchronized to the reference frequency and cooperating with the first rotary member to generate a feedback signal representing the said displacement, one of said rotary members comprising a toothed sector wheel and the other of said rotary members including a sensor responsive to said sector which to produce the feedback signal which feedback signal is compared with the recorded displacement control signal to cause the power drive to effect controlled displacement of the movable member.

5. A method of producing a continuous path recorded program for control of a machine tool, comprising illuminating a contour outline representing an article to be machined on said machine tool, scanning said outline by means of an automatically movable electro-optical line follower device, deriving signals from light-sensitive means within said device to cause said device to automatically move progressively along said outline, deriving a rotary movement from the movement of said device which is associated with means adapted to produce an alternating current signal, said signal having a frequency which varies above the reference frequency according to the rate of said rotation in one direction and varies below the reference frequency according to the rate of said rotation in the other direction, the derived rotary movement being imparted to a first rotary member within said device cooperating with a second rotary member within said device driven at a constant speed, one said rotary member including an inductor coil or equivalent signal-producing means and the other of said rotary members comprising means adapted cooperatively with said inductor coil to produce signals the frequency of which is dependent upon the direction and rate of rotation of said rotary member representing said movement and recording said signal on a recording medium for later reproduction of said movement.

6. Apparatus for producing a continuous path recorded program for control of a machine tool comprising means to automatically displace an electro-optical line follower device along a contour outline of an article to be machined on said machine tool by relative displacement of the follower device and the contour outline, said device including a first rotary member representing the displacement in a given direction of said device relative to the representation of an article to be machined, said device further including a second adjacently positioned rotary member driven by a constant speed member, signal-producing means associated with said rotary members to produce variable frequency signals at frequencies lying above and below a reference frequency corresponding to the stationary position of said first member, such variable frequency signals being recorded on a recording medium for use in the continuous path control of the machine tool, one of said rotary members being in the form of a sector wheel and the other of said rotary members comprising a light-sensitive device and a light source to produce said variable frequency signals dependent upon the relative speeds of said rotary members and lying above and below said reference frequency.

7. An apparatus for producing a continuous path recorded program for control of a machine tool comprising means to automatically displace an electro-optical line follower device along a contour outline of an article to be machined on said machine tool by relative displacement of the follower device and the contour outline, signal-producing means operable by said relative displacement to produce a frequency which varies as a continuous function dependently upon the rate of such displacement, means for recording such signal on a recording medium for use in the continuous path control of the machine tool, and manually controlled means provided for recording additional information on said recording medium representing the cutting feed or axial displacement of a cutting tool relative to the work piece to be produced.

8. Apparatus according to claim 7, wherein the means for recording said additional signals comprises a control panel having a plurality of digital selector switches by which the intended displacement of the tool can be preset, a variable speed motor controlled from said panel according to the intended cutting or axial feed, signal-producing means operated by a constant speed motor corresponding to the reference frequency for producing and recording signals representing the cutting feed, and counter elements operated from said variable speed motor as predetermined by the pre-selection of the digital selector switches to enable a sequence of signals to be recorded representing the desired cutting feed or axial movements of the cutting tool and the workpiece.

* * * * *